Aug. 16, 1966  J. G. PADELT  3,266,396
CAMERA
Filed Feb. 26, 1964  4 Sheets-Sheet 1

INVENTOR.
JOHANNES G. PADELT
BY
ATTORNEY

INVENTOR.
JOHANNES G. PADELT

BY

ATTORNEY

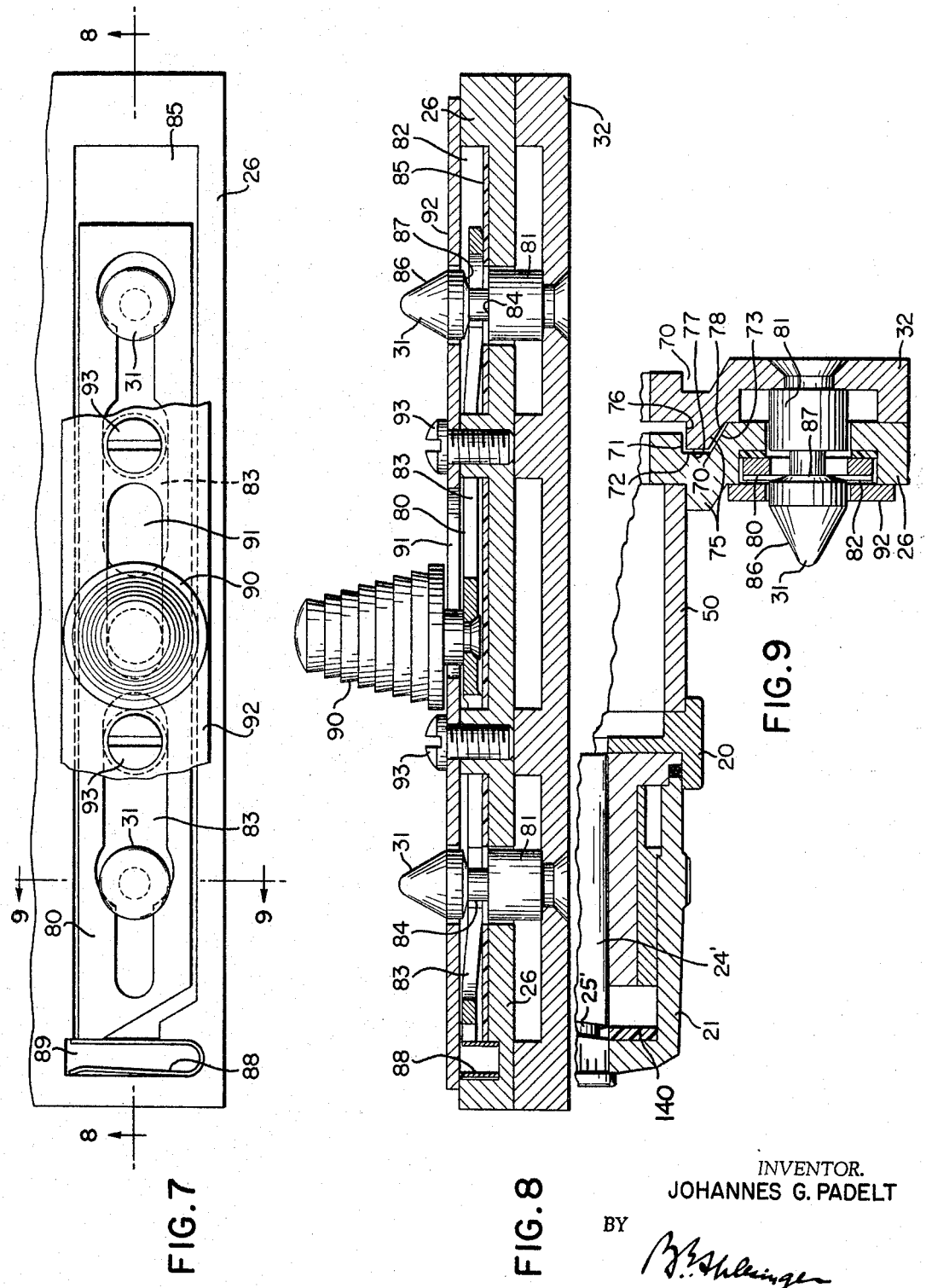

Aug. 16, 1966   J. G. PADELT   3,266,396
CAMERA
Filed Feb. 26, 1964   4 Sheets-Sheet 4
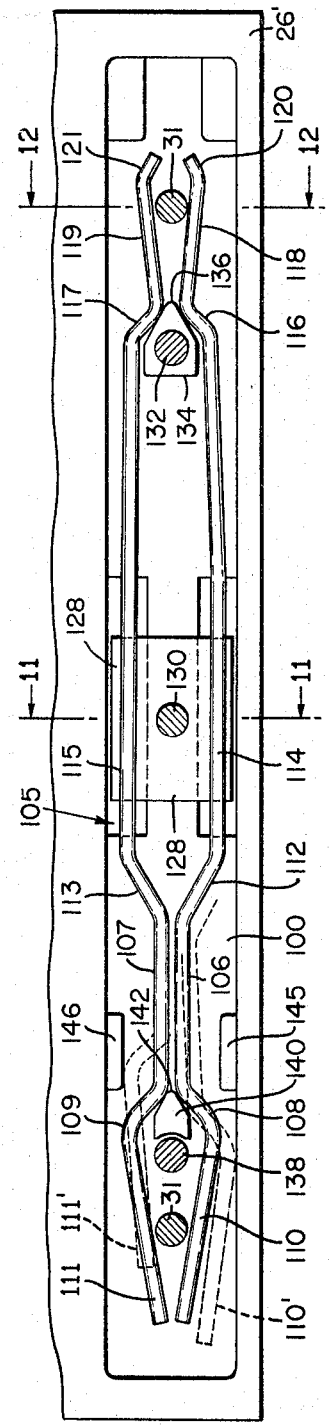
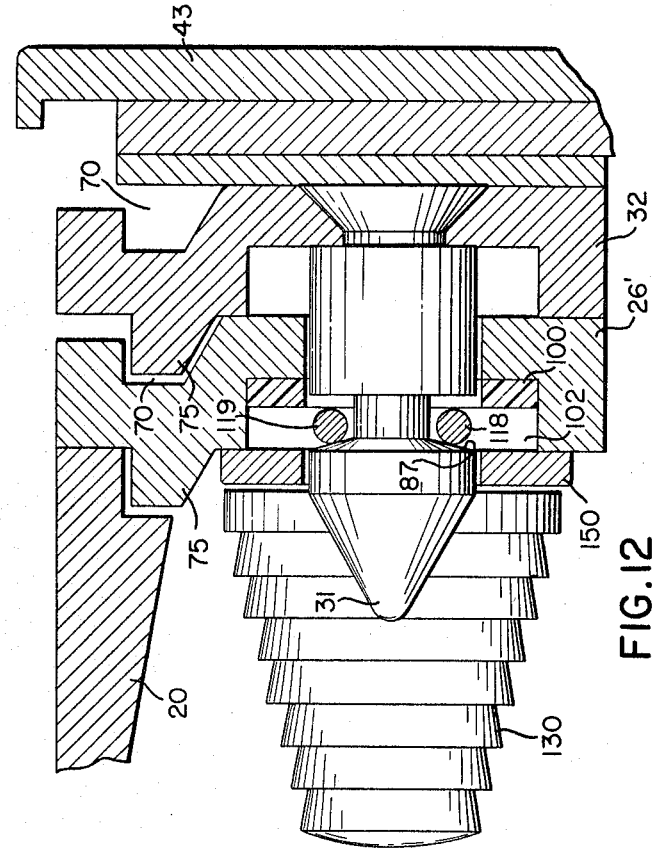
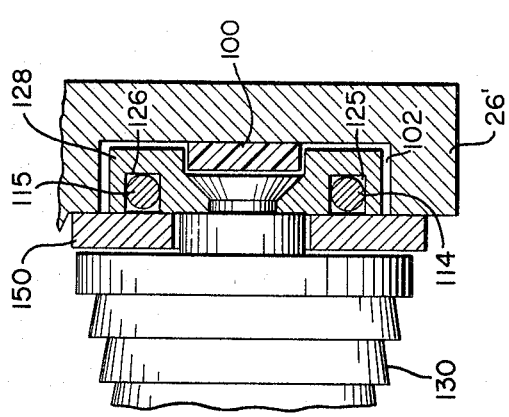
INVENTOR.
JOHANNES G. PADELT
BY
ATTORNEY

United States Patent Office 3,266,396
Patented August 16, 1966

3,266,396
CAMERA
Johannes G. Padelt, Rochester, N.Y., assignor to Graflex, Inc., Rochester, N.Y., a corporation of Delaware
Filed Feb. 26, 1964, Ser. No. 347,407
4 Claims. (Cl. 95—11)

The present invention relates to photographic cameras.

Heretofore the professional photographer and the highly skilled, deeply interested amateur have had to provide themselves with a whole series of cameras in order to take all of the pictures which either might desire to take. He might have one type camera for use in taking instantaneously developed pictures, that is "Polaroid" type. He might have another camera for ordinary roll film, and still another for slide film. He can provide himself with a camera with a removable focusing back which will permit his using sheet film, a film pack, or roll film, and the roll film used with such a back can be of different sizes; but if he wants to use 70 mm. film he must buy a special camera constructed to take that size film. If he likes a reflex camera for some of his work that means another camera; and if he wants to take some pictures with the focal plane tilted with reference to the lens axis that means still another camera. All this adds up to a very considerable investment in cameras alone; and a tremendous, impractical bulk and load of equipment to carry around.

The primary object of the present invention is to provide a camera construction comprising a basic camera housing, a lens mount therefor, and various easily attachable and easily removable accessories, whereby a photographer can quickly and readily erect an assembly that will provide him with a camera to cover almost any field of photography in which he would like to operate.

Another object of this invention is to provide a camera construction of the type described which will permit the photographer quickly and readily to assemble from a lens mount, a basic housing, and various accessories, cameras suited for large and medium format photography, and which can be used successfully and most conveniently, particularly by professional photographers.

Another object of the invention is to provide a camera construction which will enable a photographer to buy initially a low cost "stand-by" camera, and then purchase accessories which will enable him to convert that camera into a prime tool suitable for making pictures for which ordinarily other and more expensive types of cameras would be required.

Another object of the invention is to provide a quickly assemblable and disassemblable camera construction which will enable a photographer with a minimum of parts to assemble for himself quickly different types of cameras without having to buy a whole series of separate such cameras.

Another object of the invention is to provide a camera construction of the type described which is versatile and relatively inexpensive.

Another object of the invention is to provide a camera construction of the character described which is light in weight and very small for its large picture format.

Still another object of the invention is to provide a camera construction of the character described which will require a minimum of tooling cost.

Other objects of the invention will be apparent hereinafter from the specification and from the recital of the appended claims.

In the drawings:

FIG. 7 is a fragmentary plan view on an enlarged scale illustrating one type of lock mechanism which may be employed in a camera constructed according to the present invention for removably securing different backs and/or accessories to the camera housing and to one another;

FIG. 8 is a longitudinal sectional view through this mechanism taken on the line 8—8 of FIG. 7 looking in the direction of the arrows;

FIG. 9 is a transverse section through this mechanism taken on the line 9—9 of FIG. 8 looking in the direction of the arrows, and showing, also, part of the camera housing and focusing mount;

FIG. 10 is a fragmentary plan view showing a modified locking mechanism;

FIG. 11 is a section taken on the line 11—11 of FIG. 10 looking in the direction of the arrows; and FIG. 12 is a section taken on the line 12—12 of FIG. 10 looking in the direction of the arrows, part of the camera housing again being shown fragmentarily.

Figure 1:
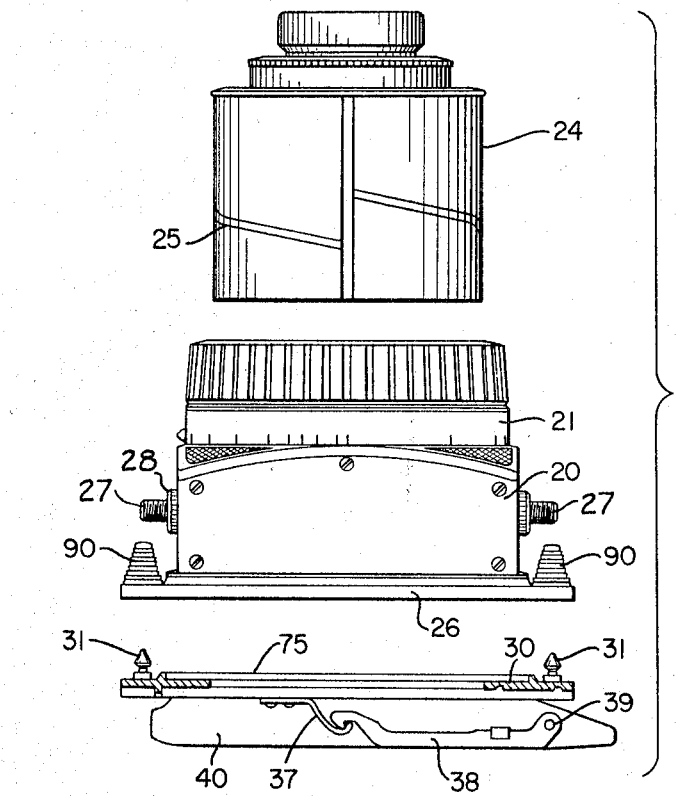
FIG. 1 is an exploded view, partly in section, showing the several parts which may be assembled into a simple type camera constructed according to one embodiment of this invention.

Referring now to the drawings by numerals of reference, 20 denotes a camera housing which, except for the quick lock receptacles at its rear, to which reference will be made further below, might be any conventional form of camera housing. That shown is provided at its front with a conventional lens focusing mount comprising a ring 21, having conventional footage scales as shown, and a knurled peripheral surface for rotating the mount to effect focusing. The mount is adapted to receive interchangeably any one of a series of focusing barrels 24 which may carry, repectively, different lenses, normal, wide-angle, telescopic, etc. with between-the-lens type shutters. The lens barrel 24 may be provided, as is conventional, with a peripheral helical groove 25, adapted to be engaged by a pin on the rotatable focusing ring 21 to effect in and out adjustment of the barrel for focusing.

The two screws 27 and nuts 28 attached at opposite sides to the housing or carrier 20 provide in combination with a conventional tripod socket convenient means to attach a special grip, a flashgun, a yoke where the camera is used as a view camera, etc.

At its rear, the camera housing 20 is provided with a rectangular plate or frame 26 and with two quick-lock devices, one disposed at each lateral side of this plate or frame as will be described further hereinafter.

Figure 2:
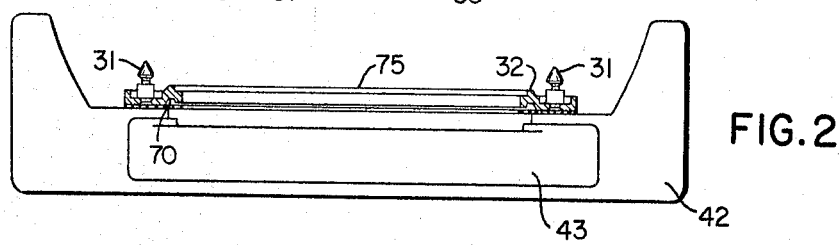
FIG. 2 is a view, partly in section, showing a different type of camera back which may be substituted for the back shown in FIG. 1 to make a different type camera.
Figure 3:
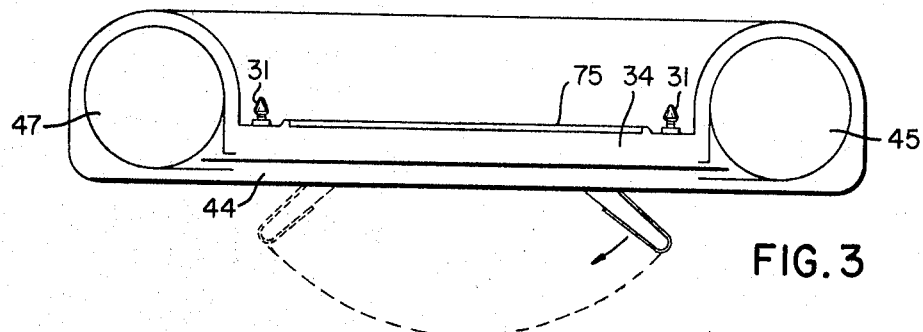
FIG. 3 is a view, partly in section, showing still another type back which may be substituted for the back of FIG. 1 to provide a still further type of camera.
Figure 4:
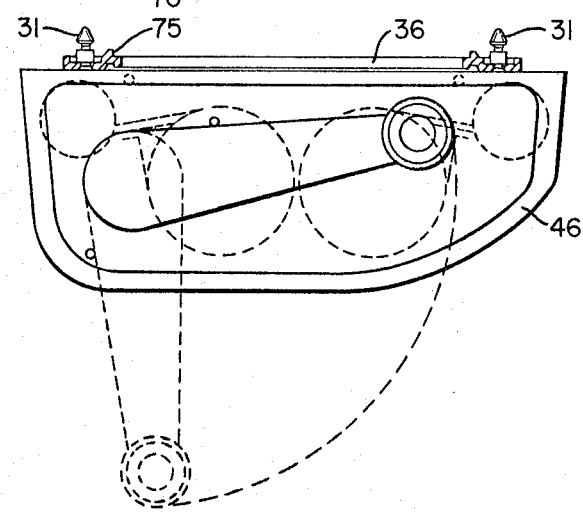
FIG. 4 is a view, partly in section, showing a still further type of back which may be substituted for any of the backs of FIGS. 1, 2 and 3 to assemble still another type of camera.

To the plate 26 there may be selectively secured a camera back such as shown at 30 in FIG. 1, or a camera back such as shown at 32 in FIG. 2, or a camera back such as shown at 34 in FIG. 3, or a camera back such as shown at 36 in FIG. 4.

The camera back 30 may be similar in general to the camera back 20 shown in the Dalton U.S. Patent No. 2,549,670, that is, it may have riveted to it at opposite sides hooks 37 shaped to be engaged by the hooked free ends of arms 38, each of which is pivotally connected at one end, as denoted at 39, to a focusing panel 40. This panel may be of the same type as shown at 25 in Patent No. 2,549,670. As described in Patent No. 2,549,670, the arms 38 permit moving the focusing panel 40 away from the camera back 30, while it is still hooked to the back, so as to permit insertion between the back and the focusing panel of a film-pack adapter or of a sheet film holder as described in Patent No. 2,549,670. Furthermore, the arms 38 may be disengaged from the hooks 37 to permit substitution for the focusing panel 40 of a conventional roll film holder such as shown at 75 in Patent No. 2,549,670, the back 30 being recessed, like the back 20 of Patent No. 2,549,670 to receive the roll film holder, and being provided with conventional locking means, such as the slide locks 65 of Patent No. 2,549,670 for securing the roll film holder to the back.

The backs 30, 32, 34 and 36 are provided, each of them, with a plurality of studs 31 having conical heads and neck portions of reduced diameter for engagement by the quick locking means which will be described below, for releasably securing the respective backs to the camera housing.

The back 32 of FIG. 2 differs from the back 30 of FIG. 1 in that it is fixedly secured to a casing 42 that is adapted to hold a standard "Polaroid" film-pack. This casing 42 is recessed at its front, as shown, so as to straddle the rear of the camera housing; and the back 32 is mounted in this recess with the quick lock members 31 in position to register with and be engaged by the quick lock mechanisms carried by plate 26, when the casing 42 is secured to the camera housing 20.

The back 34 of FIG. 3 differs from the two previously described backs in that it is fixedly secured to a housing 44 that is adapted to hold a film cassette 45 for, for instance, 70 mm. film, and a take-up spool 47.

The back 36 of FIG. 4 is fixed to a 70 mm. roll holder housing 46 of conventional construction.

Figure 5:
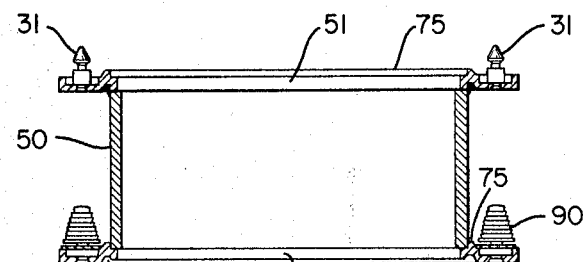
FIG. 5 is a longitudinal sectional view of an accessory which may be inserted between the camera housing and any of the backs shown in FIGS. 1, 2 and 3 to provide an extension for the camera housing which may, for instance, be a reflex type housing.

For some work it is desirable that the focal plane of the camera be at a greater distance from the lens than is possible where backs such as shown in FIGS. 1, 2, 3, and 4 are secured directly to the camera housing. To achieve this, an extension collar, such as shown at 50 in FIG. 5, may be employed. This collar carries at its front end a frame or plate 51 which is provided with quick lock members 31 for engagement by the quick lock devices carried by the plate 26 at the rear of the camera housing; and this collar 50 has at its rear end a frame or plate 52 which carries at opposite sides quick lock receptacles to receive and engage the quick lock members 31 on any of the backs shown in FIGS. 1, 2, 3 and 4. With this extension collar 50, therefore, the backs can be spaced from the camera housing.

The collar 50 may be in the form of a conventional reflex housing if desired, further extending the possibilities of the built-up camera of this invention.

Figure 6:
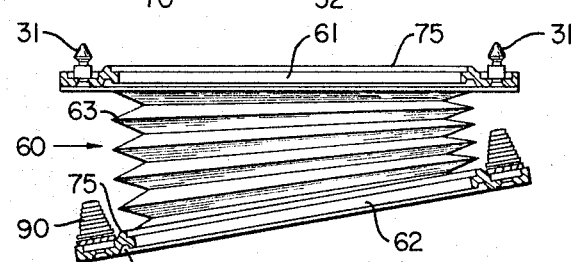
FIG. 6 is a sectional view of another type of accessory which may be inserted between the camera housing and any of the backs shown in FIGS. 1, 2 and 3 to convert the camera into a view type camera.

In place of the extension collar 50, or in addition thereto, another accessory, such as shown at 60 in FIG. 6, may be used. This accessory comprises a front plate or frame 61, a rear plate or frame 62, and an extension bellows 63 interposed between the two plates 61 and 62. The front plate 61 carries at opposite sides two quick lock members 31 for engagement with the quick-lock receptacles of the camera housing 20 or of the extension collar 50. The rear plate 62 carries lock receptacles, which are adapted to receive and engage the lock members 31 of any of the backs. The part 60 permits of assembly of a view camera from the parts 20, 24 and 60.

To prevent light leaks and insure a light-proof camera assemblage, the rear plate 26 of the camera housing has a rectangular groove 70 (FIG. 9) in its rear face which has one side wall 71 extending at right angles to its bottom face 72, and the other side wall 73 inclined to the bottom face 72. The recess 70 is adapted to receive selectively a rectangular rib 75 that is integral with each of the back plates 30, 32, 34 and 36. Each of the ribs 75 is shaped in correspondence to the shape of the groove 70 in which it is adapted to engage. It has one side wall 76 perpendicular to its top land 77, and its other side wall 78 inclined thereto. Further than this, in order to achieve economy in manufacture, the castings 26, 30, 32, 34, and 36 are made identical with one another and with castings 51, 52, 61, and 62 so that all these parts are interchangeable and will interfit with one another and the greatest possible economy may be achieved in manufacturing as well as simplicity inasmuch as the same tolerances can be used on all of these parts.

The several plates 30, 32, 34, 36, 51, 52, 61 and 62 are all made alike with groove 70 on their rear faces and ridges 75 on their front faces. All of the parts, which can be used to assemble the various types of cameras, which can be built up with the present invention, are, therefore, readily nestable with one another.

For locking the part 30, 32, 34, 36, 50, 60 to the camera housing 20, or for locking any of these parts to extension collar 50 or extension bellows 60, spring clamping straps 80 may be provided as shown in FIGS. 7, 8 and 9. Each of these straps is reciprocable in a groove 82 formed in the upper face of the plate 26, or, in the cases of the parts 50 and 60, in the upper face of the plates 52 and 62, respectively. Each strap 80 adjacent its right hand end, as viewed in FIG. 8, is bent forwardly about five degress for a portion of its length and then is bent rearwardly again, and then is bent forwardly again adjacent its left hand end. Adjacent each end each strap 80 has a slot 83 therethrough adapted to receive the neck 84 of one of the lock members 31.

These lock members are riveted in the respective parts 30, 32, 34, 36, 51, 52, 61, 62; and each has a cylindrical body portion 81, the reduced diameter neck portion 84, and the conical head portion 86. The head of each lock member also has a slightly conical undersurface 87.

The lower portions of the strap 80 slide on a nylon sheet 85 which is mounted in the groove 82. A U-shaped leaf spring 88 (FIGS. 7 and 8), which is mounted in a groove 89 in the plate 26, or in the cases of plates 52 and 62 in corresponding grooves in those plates, and one leg of which seats against one end of the strap 80, serves constantly to urge the strap toward locking engagement with the lock members 31. A pusher 90, which is riveted to each strap intermediate its ends, and which extends up through a slot 91 in a cover plate 92, serves to retract and unlock the strap. Screws 93 serve to secure the cover plate 92 to the plate 26, or to the plates 52 or 62 as the case may be. Slots 83 are shaped, as shown in FIG. 7, to permit the lock members 31 to pass therethrough when the strap 80 is moved to the left in this figure by pusher 90. The cover plates 92 help protect and keep dirt out of the parts housed in the grooves 82.

Somewhat different locking means is shown in FIGS. 10, 11 and 12. The rear plate or frame of the camera housing is here denoted at 26'. It is like the plate or frame 26 previously described except for the grooves 102 and the locking members contained therein. Here a plastic strip 100 is mounted in each of two recesses 102 in the frame 26', similar to the recesses 82 of FIG. 9. Mounted in each recess 102 on top of each strip 100 are two wires which are resilient, and which together constitute a lock receptacle 105. They are formed as shown in FIG. 10. These wires have parallel portions 106 and 107 which at one end join diverging portions 108 and 109, respectively; and these diverging portions join converging portions 110 and 111, respectively. At their other ends the portions 106 and 107 diverge from one another as indicated at 112 and 113, and then extend parallel to one another as indicated at 114 and 115, and then converge again as indicated at 116 and 117, and then diverge again as indicated at 118 and 119, and at their very ends they converge and extend toward one another again as indicated at 120 and 121.

These wires are secured within grooves 125, 126 of a block 128 and are soldered or otherwise fixed to this block, which is slidable in the groove 102. A pusher 130, similar to the pusher 90 of FIG. 8, is riveted to the block 128.

Fixed by a screw 132 (FIG. 10) to the strip 100 is a block 134 having a nose 136 whose sides converge. Also fixed to the strip 100 by a screw 138 is a block 140 having a nose portion 142. Each strip 100 has integral lugs 145, 146 at opposite sides which press on the outsides of the portions 110 and 111 of the associated wires, when the block 128 is moved to the right, thereby to lock the wires under the heads of the associated lock members 31 to secure the back 32, 34, or 36, or the part 50 or 60, to the camera housing 20, or to lock any of the backs to the parts 50 or 60. Again the conical undersides of the lock members 31 increase the locking action, as hown in FIG. 12. A cover 150 is provided, as before, to cover the groove 102.

There are, of course, two locking devices 105 on each part 26', 52 or 62, disposed one at each side of the part. When a part 26', 52, 62 is to be connected to another part, each locking receptacle 105 is in the full line position shown in FIG. 10 so that when the part, which is to be attached to part 26', 52 or 62, is pressed against the part 26', 52 or 62, the heads of the lock members 31 will press the wires apart and the lock members 31 will pass therebetween and snap over the wires. To securely lock the parts of the camera together, each locking receptacle 105 is moved to the right in FIG. 10 by its pusher 130. The dotted portion 111' indicates the position of the portion 111 of one of the wires when in its locking position. To uncouple the parts of the camera from one another each pusher 130 is moved to the left. 110' denotes the positon of the portion 110 of one of the wires when the locking receptacle is in released position. In this position the heads of the members 31 will readily pass between the wires so that the parts can be uncoupled from one another.

From the preceding description, it will be seen that I have provided a camera construction which will enable any one of many different types of cameras to be built up in building block fashion from a few basic parts. Thus the expanse and burden of having to carry around many different cameras to meet different conditions and situations in avoided. For instance, as illustrated in FIG. 9, a spacer of any suitable length may be interposed between the carrier 20 for the focusing mount 21 and the plate 26. For wide-angle lenses this spacer can be made so short as to be hardly more than a slim ring so that the front piece or carrier 20 of the camera can abut at its rear directly against the plate 26, thereby to shorten the distance between the lens and the focal plane. The wide-angle lens then could have its own special focusing mount fastened to this thin carrier ring. Alternatively, the same plate 26 and carrier 20 can hold any between-the-lens shutter if used, for example, in combination with a bellows focusing attachment of a view camera such as shown in FIG. 6.

Each of the two forms of locking mechanisms disclosed will be its rest position (FIGS. 7 and 10) lock the two components of the building block system together. The conical heads of the lock members 31 push the strips 80 to the left against the resistance of the springs 88 (FIG. 7) as they are forced through slots 83; and the conical heads of these members spread the wires apart in FIG. 10 as they pass between the wires. The springs 88 snap the straps 80 back into locking position as soon as the heads of the members 31 have passed through the slots 83; and the resilience of the wires of receptacle 105 snap them back into locking engagement with the members 31 in the device of FIG. 10 after the heads of these members have passed between the wires. Each locking mechanism is moreover easily moved to unlocked position with one hand by pressing on pusher 90 or 130.

In the camera shown fragmentarily in FIG. 9, the focusing mount may be of the construction disclosed in the companion application of Archie H. Gorey, Serial No. 343,710, filed February 10, 1964. Here 140 is a rotatable flexible plastic ring which engages in the helical groove 25' in the lens barrel 24'; and here the lens barrel carries the focusing scale which lines up with an index mark on the ring. The footage scale on the barrel becomes visible when focusing.

With the construction of the present invention a viewfinder and/or a rangefinder can be coupled to the lens mount of the camera, if desired.

While the invention has been described in connection with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Camera equipment comprising
   (a) a camera housing,
   (b) a focusing mount for interchangeable lenses mounted in the front end of said housing,
   (c) means for selectively securing to said housing any one of a plurality of camera backs for holding, respectively, sheet film and roll film any of a plurality of hollow camera accessories having an opening extending therethrough from front to rear comprising
   (d) a first plate fixed to the rear of said housing, a second plate secured to the front of each back, a third plate secured to the front of each accessory, and a fourth plate secured to the rear of each accessory, said first plate, and each of said second, third and fourth plates having a closed groove in its rear face, and said second, third and fourth plates having a matching closed rib on its front face to engage in any one of said grooves,
   (e) said housing, backs and accessories having cooperating means for detachably releasably-locking selectively a back or an accessory selectively to the rear end of said housing, and a back selectively to the rear end of said accessory with the accessory interposed between the rear end of the housing and the front face of a back,
   (f) said cooperating locking means comprising a resilient locking member mounted in the rear of said housing and in the rear of each accessory, and a headed locking member secured to each back and to the front end of each accessory and adapted to be engaged in each resilient locking member.

2. Camera equipment as claimed in claim 1 wherein one side wall of each groove is perpendicular to the bottom face of said groove and the other side wall of each groove is inclined thereto, and wherein the ribs are of matching shape.

3. Camera equipment as claimed in claim 2, wherein
   (a) said resilient locking member comprises a strap having a hole therethrough,
   (b) said headed locking member comprises a stud having a generally conical head which is adapted to be passed through said hole and to engage over said strap to lock the back and housing together, and
   (c) a spring is mounted in said housing to engage said strap and constantly urge said strap resiliently toward locking position.

4. Camera equipment as claimed in claim 3, wherein
(a) said strap is resilient,
(b) the head of each headed locking member has a conical underface and a neck of reduced diameter beneath its head,
(c) said strap has an inclined portion,
(d) said spring constantly urges said strap in a direction to cause its inclined portion to engage the conical underface of said headed locking member, and
(e) both said studs and said straps are disposed between the perimeters of said plates and the associated ribs or grooves on the plates.

References Cited by the Examiner
UNITED STATES PATENTS

| | | | |
|---|---|---|---|
| 331,448 | 12/1885 | Ripley | 88—24 |
| 365,435 | 6/1887 | Freeman | 95—11 |
| 2,548,529 | 4/1951 | Harvey | 95—11 |
| 2,609,739 | 9/1952 | Tatro | 95—34 |
| 2,740,338 | 4/1956 | Bing | 95—11 |
| 2,800,843 | 7/1957 | Melita | 95—31 |
| 2,830,513 | 4/1958 | Saner | 95—64 |
| 2,911,894 | 11/1959 | Hennig | 95—11 |
| 3,118,360 | 1/1964 | Marjoram | 95—45 |
| 3,160,083 | 12/1964 | Neumeister | 95—34 |
| 3,165,993 | 1/1965 | Stern | 95—48 |

FOREIGN PATENTS 794,628    5/1958    Great Britain.

OTHER REFERENCES

Publication, "The Hasselblad Idea," Journal of the Photographic Society of America, July 1958, page 12.

JOHN M. HORAN, *Primary Examiner.*